United States Patent [19]

Louise et al.

[11] Patent Number: 5,238,670
[45] Date of Patent: Aug. 24, 1993

[54] PROCESS FOR PREPARING ULTRA-PURE NITROGEN

[75] Inventors: Jean Louise, Villejuif; Bertrand Mollaret, Viroflay; Jean-Yves Thonnelier, Voisins le Bretonneux; Daniel Gary, Montigny le Bretonneux, all of France

[73] Assignee: L'Air Liquide, Societe Anonyme pour l'Etude et l'Exploitation des Procedes Georges Claude, Paris, France

[21] Appl. No.: 685,174

[22] Filed: Apr. 15, 1991

[30] Foreign Application Priority Data

Apr. 20, 1990 [FR] France ................... 90 05065
Oct. 22, 1990 [FR] France ................... 90 13039

[51] Int. Cl.$^5$ .................. C01B 21/04; C01B 31/18
[52] U.S. Cl. ...................... 423/351; 203/49; 423/247
[58] Field of Search ............ 423/247, 351; 203/49

[56] References Cited

U.S. PATENT DOCUMENTS

| | | | |
|---|---|---|---|
| 2,826,480 | 3/1958 | Webster | 423/351 |
| 3,545,915 | 12/1970 | Lutchko et al. | 423/247 |
| 4,003,979 | 1/1977 | Kanno | 423/247 |
| 4,019,879 | 4/1977 | Rabo et al. | 55/68 |
| 4,579,723 | 4/1986 | Weltmer et al. | |
| 4,869,883 | 9/1989 | Thorogood et al. | |
| 4,917,711 | 4/1990 | Xie et al. | |
| 4,960,579 | 10/1990 | Campbell | 423/351 |
| 5,061,464 | 10/1991 | Cardonna, Jr. et al. | 423/247 |

FOREIGN PATENT DOCUMENTS

| | | |
|---|---|---|
| 0154855 | 7/1989 | European Pat. Off. |
| 1475657 | 4/1967 | France |
| 21742 | 10/1964 | Japan ............ 423/247 |

OTHER PUBLICATIONS

"Purification of technical-grade gases for use in the manufacture of optical fibers", *Chemical Abstracts*, vol. 111, No. 18, Oct. 30, 1989, No. 156875k, By V. Fainshtein et al.

"Equipment and process for producing superpure nitrogen from common nitrogen", *Chemical Abstracts*, vol. 107, No. 20, Nov. 1987, No. 179402k, By D. Cheng et al., p. 202.

"Catalyst for removal of hydrogen and oxygen from inert gases", *Chemical Abstracts*, vol. 107, No. 20, Nov. 1987, No. 179503a, By Y. Chen et al., p. 211.

*Primary Examiner*—Wayne Langel
*Attorney, Agent, or Firm*—Young & Thompson

[57] ABSTRACT

Process and apparatus for preparing ultra-pure nitrogen containing less than 100 ppb (parts per billion) impurities, characterized in that at least the impurities consisting of carbon monoxide (CO) and/or hydrogen ($H_2$) are removed by passing the gas from which at least one of these two components has to be removed, over a bed of particles including a metallic element namely copper (Cu) and/or ruthenium (Ru) and/or rhodium (Rh) and/or palladium (Pd) and/or osmium (Os) and/or iridium (Ir) and/or platinum (Pt) supported on a particulate support, by the technique of ion exchange and/or by the technique of impregnation. This technique enables to produce ultra-pure nitrogen by using it on air to be distilled as an additional step for the removal of $CO_2$ and $H_2O$.

8 Claims, No Drawings

PROCESS FOR PREPARING ULTRA-PURE NITROGEN

BACKGROUND OF INVENTION (a) Field of the Invention

The present invention concerns the preparation of ultra-pure nitrogen, having an amount of residual impurities (essentially CO, $H_2$, $CO_2$, $H_2$ and $O_2$) lower than a few tens of ppb (parts by billion), generally less than 10 ppb, and, even still less, of the order of 1 ppb.

(b) Description of Prior Art

Pure nitrogen is generally obtained by cryogenic distillation of air, which enables to separate nearly all of the oxygen, while carbon dioxide and water vapor have previously been removed by being blocked on an adsorbent before distillation.

However, carbon monoxide (CO) and hydrogen ($H_2$) which are present in the air are found again in nitrogen after distillation, unless there is provided, in the case of hydrogen, the addition of a complementary distillation column, which has been found to be particularly costly.

This is the reason why, presently, air is pretreated after compression and before being sent towards the drying and decarbonating device, by catalytic means utilising precious metals such as platinum and palladium supported on alumina and at elevated temperature, above 100° C. or in the case of carbon monoxide, copper oxide CuO at a temperature of the order of 150° C., after which, the air thus purified can be sent towards the distillation column, but this operation at elevated temperature which is carried out on the entire flow of air is also costly and it is difficult to achieve the aimed limit of 10 ppb, for carbon monoxide as well as for hydrogen, in which the residual amounts remain of the order of 100 ppb.

In the document U.S. Pat. No. 4,869,883, it has been proposed to use purifiers which treat nitrogen at elevated temperature to remove CO, $CO_2$, $H_2O$, $O_2$, $H_2$, and which operate by removing oxygen by reaction with CO and/or $H_2$ with Cu with production of $CO_2$ and/or $H_2O$, by removal of CO and/or $H_2$ on CuO, followed by removal of $CO_2$ and $H_2O$ on molecular sieves, possibly preceded by a bed of alumina. Such purifiers are relatively complicated to operate and, for example, require a large number of high pressure reservoirs at elevated temperature. A process of the same type operating at room temperature on a nickel base catalyst (NiO and Ni with about 50% by weight of Ni with at least 5% by weight of Ni in the form of Ni metal) is described in the document E.P.-A-240,270, which enables to reduce the amount of impurities to below 100 ppb. It has the disadvantage of requiring a regeneration utilising a gas containing hydrogen. Generally, attempts have even been made to block CO and $H_2$ by adsorption, however the adsorbents or known sieves do not operate for $H_2$ and are not very efficient for CO. For example, the 13X molecular sieve blocks $CO_2$ but very little CO. However, it is known that the efficiency of these absorbents may be improved by exchange of copper ions (Cu) or impregnation of palladium (Pd), but no proposal has yet been made to adapt this technique to the preparation of ultra-pure nitrogen.

SUMMARY OF INVENTION

It is an object of the present invention to provide a process which is simple, efficient and not very costly for the preparation of ultra-pure nitrogen reaching the following double aim:

a very low limit of blocking, of the order of 10 ppb with a ratio of quantity of gas to be treated/quantity of blocked product enabling an operation at reduced costs.

For this purpose, according to the invention, at least the impurities consisting of carbon monoxide (CO) and/or hydrogen ($H_2$) are substantially removed by passing air from which at least one of these two components are intended to be removed over a bed consisting of particles of at least one metallic element, selected from copper (Cu) and/or ruthenium (Ru) and/or rhodium (Rh) and/or palladium (Pd) and/or osmium (Os) and/or iridium (Ir) and/or platinum (Pt), supported on a support of particulate material of with high surface area, the operation of supporting the metallic element being carried out by a technique, known per se, of ion exchange and/or impregnation. According to the invention, copper and/or either of the six metals of group VIII of the periodic classification of the elements belonging to the platinum family are used as metallic element on a suitable support of particulate material which can be zeolite, and/or alumina and/or silica. Preferably, either of the six metals of group VIII are used.

Within the scope of the present invention, the term "metallic element" includes metal particles in reduced state or an ionic species.

Before the treatment according to the process of the invention, the gases to be purified normally contain less than 40 ppm, more generally less than 10 ppm carbon monoxide and equivalent amounts of hydrogen.

The initial preparation of the support of metallic elements in particulate form used in the invention is carried out in three steps, namely:

an operation of pretreatment of the support of particulate material;

a contact of a solution containing a precursor of the metallic element with the support of particulate material;

a progressive drying, preferably by flushing with a neuyral gas such as nitrogen;

Contact is carried out either with an excess of solution which is thereafter separated from the support of particulate material after a certain contact time (technique of ion exchange), or with a quantity of solution equal to that which the support of particulate material can absorb (technique of impregnation). Preferably, said solution is an aqueous solution.

If it is desired to have the metallic element in the form of particles of metal in reduced state, there may be provided a fourth step of reduction, for example by means of a gas containing hydrogen, at elevated temperature.

In the particular case of copper on a support of particulate zeolite, it has been observed during tests that the weight of the metallic element with respect to the total weight of the bed of particulate zeolite support was between 10% and 15%. In all the other cases, a weight of the active metallic element with respect to the total weight of the support of particulate material of between 0.1% and 5% is sufficient.

Depending on cases, the operation of removal of the CO and/or $H_2$ impurities is carried out either at a temperature in the vicinity of room temperature, between 0° C. and 50° C., possibly as low as −30° C., or at an elevated temperature above 100° C.

The invention can be used for the purification of air before distillation thereof by passage, after removal by adsorption in a dryer-decarbonator of at least the water vapor, at a temperature in the vicinity of room temperature between 0° C. and 50° C., of the air to be distilled over a bed consisting of particles of at least one metallic element selected from copper (Cu) and/or ruthenium (Ru) and/or rhodium (Rh) and/or palladium (Pd) and/or osmium (Os) and/or iridium (Ir) and/or platinum (Pt) to block carbon monoxide, and, in the case where the first bed of particles is exclusively a bed of particles of copper, the next step includes blocking hydrogen, on a second bed of particles consisting of particles of metallic elements selected from ruthenium (Ru) and/or rhodium (Rh) and/or palladium (Pd) and/or osmium (Os) and/or iridium (Ir) and/or platinum (Pt), supported on a support of particulate material. It may be sufficient, possibly, to operate in such a manner that the air from which at least water vapor has been removed passes at a temperature in the vicinity of room temperature between 0° C. and 50° C. through a bed of particles of copper supported on a support of particulate material to block only carbon monoxide.

As a variant, air to be distilled is treated at elevated temperature of the order of 100° C. to 300° C. through either a single bed of particles of at least one metallic element selected from copper (Cu) and/or ruthenium (Ru) and/or rhodium (Ru) and/or palladium (Pd) and/or osmium (Os) and/or iridium (Ir) and/or platinum (Pt) supported on particulate zeolite support, or a double bed which comprises a first bed of particles of copper and a second bed of particles of at least one metallic element selected from ruthenium (Ru) and/or rhodium (Rh) and/or palladium (Pd) and/or osmium (Os) and/or iridium (Ir) and/or platinum (Pt) supported on a particulate zeolite support. As a variant, there is first provided a main drying, then a treatment at elevated temperature on such beds of particles of at least one metallic element selected from copper (Cu) and/or ruthenium (Ru) and/or rhodium (Rh) and/or palladium (Pd) and/or osmium (Os) and/or iridium (Ir) and/or platinum (Pt) supported on a zeolitic support of particulate material followed by a final complementary drying and decarbonation.

However it has been found particularly advantageous to regenerate the bed consisting of particles of at least one metallic element selected from copper (Cu) and/or ruthenium (Ru) and/or rhodium (Rh) and/or palladium (Pd) and/or osmium (Os) and/or iridium (Ir) and/or platinum (Pt), supported on a support of particulate material, with a gas, such as nitrogen, for example one resulting from distillation, at a temperature above 100° C.

In the embodiments operating at a temperature in the vicinity of room temperature on air to be distilled, the invention also concerns a device for the preparation of ultra-pure nitrogen, where at least one bed for blocking hydrogen and carbon monoxide is disposed inside a single enclosure, the operation being carried out by means of two identical enclosures, one operating at room temperature for the purification, while the other operates as a regeneration, as a result of an increase of temperature and/or a decrease of pressure, possibly below atmospheric pressure, and/or of a dilution flushing with the gas to be purified and/or of the oxygen enriched air.

In the embodiment operating at a temperature in the vicinity of room temperature, the invention concerns a device for purifying air intended to be distilled, with beds of particulate support to block hydrogen and carbon monoxide associated with the beds of adsorbents intended to block water vapor (such as alumina) and of molecular sieve (such as zeolite 13X) to block carbon dioxide, water vapor and other polluting agents, into a single blocking enclosure. Preferably the beds of particulate support blocking hydrogen and carbon monoxide are disposed downstream of at least the bed for blocking water vapor, and, in addition, the blocking enclosure comprises, preferably downstream of the beds for blocking $H_2$ and CO, additional beds for the final blocking of traces of water vapor and carbon dioxide.

The invention is now illustrated by the embodiments which follow, which outline certain results according to the invention and others which are inoperative.

Results: ($Ncm^3$ express the volume in $cm^3$ at 0° C. and under one atmosphere)

| -On nitrogen at room temperature: | |
|---|---|
| .Cu exchanged sieve: | no $H_2$ block |
| | CO block: < 2 ppb |
| | rate of adsorption |
| | upon through-flow = |
| | 0.42 $Ncm^3/g$ |
| | ($Ncm^3$ of CO per |
| | gram of adsorbent) |
| .Pd impregnated sieve: | Co = 15 ppb |
| | $H_2$ < 10 ppb |
| | rate of adsorption |
| | upon through-flow = |
| | 0.27 $Ncm^3/g$ |
| | ($Ncm^3$ of CO and $H_2$ |
| | per gram of adsorbent) |
| .Cu+ exchanged sieve | CO < 2 ppb |
| Pd impregnated sieve: | $H_2$ < 3 ppb |
| | rate of adsorption |
| ″ | upon through-flow = |
| | 0.67 $Ncm^3/g$ |
| | ($Ncm^3$ of CO and $H_2$ |
| | per gram of adsorbent) |

There are simultaneously obtained low limits as well as interesting yields. Reversibility has been established by repeating the tests.

| -On air at room temperature: | |
|---|---|
| .Cu exchanged sieve: | no $H_2$ block |
| | CO block: Limit = 6 ppb |
| | rate of adsorption |
| | upon through-flow = |
| | 0.16 $Ncm^3/g$ |
| | ($Ncm^3$ of CO per |
| | gram of adsorbent) |
| .Pd impregnated sieve: | CO = 6 ppb |
| | $H_2$ = 10 to 20 ppb |
| | during 10 days |
| | formation of $CO_2$ in the |
| | reactor which is thereafter removed at room temperature. |
| -On air at elevated temperature: | |
| .Cu+ exchanged sieve | $H_2$ > 10 ppb |
| Pd impregnated sieve at 100° C.: | CO = 7 ppb |

EXAMPLES OF OPERATION

There is prepared a first bed of zeolites of type 5A (24.6 g) of which 60% of the ions are exchanged with $Cu^{2+}$ ions and a second bed of mordenite (23 g) impregnated with 3.5% (by weight) of palladium, in two columns having a diameter of 12 mm and a length of 250 mm and the following tests are carried out:

First Test:

Cryogenic nitrogen ($N_2$) is passed in the columns, at a flow of 126 Nl/h under 7 bar at room temperature, having a water content below than 150 ppb, a CO content of 2 ppm (part per million $10^{-6}$) and an amount of hydrogen content of 1.7 ppm. At the exit, nitrogen contains only an amount of CO of the order of 1 ppb and an amount of hydrogen lower than 3 ppb. This result is maintained for a period of 67 hours.

Second Test:

Air having a water content lower than 150 ppm, a CO content of 2 ppm and a content of $H_2$ of 1.3 ppm. is passed in the columns, at a rate of of 126 Nl/h under 7 bar, at room temperature. The air which exits has a CO content of 6 ppb and a hydrogen content of 10 to 20 ppb which is kept constant for a minimum of 10 days.

Third Test:

This test is identical to the second test, except that the air is heated at 100° C. The air which exits has a CO content of 7 ppb and a hydrogen content lower than 10 ppb.

The invention applies to the preparation of ultra-pure nitrogen, for example used in the electronic industry.

We claim:

1. A process for preparing ultra-pure nitrogen from air to be distilled containing CO, comprising removing water vapor from said air to be distilled until said air has a water content lower than 150 ppm; then passing said air at a temperature of 0° to 50° C. in contact with a bed of particles on which there has been deposited by at least one of ion exchange and impregnation, at least one metallic element selected from the group consisting of copper, ruthenium, rhodium, palladium, osmium, iridium and platinum; and thereafter distilling the air to recover ultra-pure nitrogen.

2. A process as claimed in claim 1, wherein said metallic element is selected from the group consisting of ruthenium, rhodium, palladium, osmium, iridium and platinum.

3. A process as claimed in claim 2, wherein both carbon monoxide and hydrogen are removed from the air to be distilled.

4. A process as claimed in claim 1, wherein said particles are a member selected from the group consisting of zeolite, alumina and silica.

5. A process as claimed in claim 1, wherein water vapor is removed from the air to be distilled by passing the air to be distilled over an adsorbent bed.

6. A process as claimed in claim 1, wherein said bed is in two portions, and one of said portions is used to purify the air to be distilled while the other portion is subjected to regeneration.

7. A process as claimed in claim 1, wherein the weight of said metallic element is from 0.1 to 5% by weight of said bed.

8. A process for preparing ultra-pure nitrogen from air to be distilled containing CO, comprising passing said air to be distilled in contact with a bed of particles on which there has been deposited metallic copper by at least one of ion exchange and impregnation, and thereafter distilling the air to recover ultra-pure nitrogen, wherein said particles are a zeolite and the weight of said copper is between 10 and 15% of the weight of said zeolite.

* * * * *